United States Patent [19]

Maeda

[11] Patent Number: 5,430,704
[45] Date of Patent: Jul. 4, 1995

[54] REPRODUCING SYSTEM FOR AN OPTICAL DISC

[75] Inventor: Takanori Maeda, Saitama, Japan

[73] Assignee: Pioneer Electronic Corporation, Tokyo, Japan

[21] Appl. No.: 138,445

[22] Filed: Oct. 20, 1993

[30] Foreign Application Priority Data

Oct. 30, 1992 [JP] Japan .................. 4-291885

[51] Int. Cl.⁶ .............................................. G11B 7/00
[52] U.S. Cl. .................. 369/124; 369/44.37; 369/44.41; 369/109; 369/120
[58] Field of Search ............... 369/44.37, 44.41, 107, 369/116, 120, 124, 44.23, 109

[56] References Cited

U.S. PATENT DOCUMENTS

| | | | |
|---|---|---|---|
| 4,831,609 | 5/1989 | Suzuki | 369/124 X |
| 5,090,004 | 2/1992 | Ohsato | 369/44.37 |
| 5,153,863 | 10/1992 | Noda | 369/44.41 |
| 5,253,238 | 10/1993 | Shimonou | 369/44.41 X |

Primary Examiner—Joseph A. Popek
Assistant Examiner—Son Mai
Attorney, Agent, or Firm—Nikaido Marmelstein Murray & Oram

[57] ABSTRACT

An optical disc has recorded information and is irradiated with a laser beam at a first spot for reading information recorded on the disc and at a second spot. The second spot has such an area that intensity of light reflected at the second spot does not change with change of the recorded information. A first photodetector is provided for detecting intensity of light reflected on the first spot, and a second photodetector is provided for detecting intensity of light reflected on the second spot. A subtracter is provided for producing the difference between outputs of the first photodetector and the second photodetector and an alternating current detector is provided for producing an output at a slice level where the difference of the subtracter becomes zero.

3 Claims, 6 Drawing Sheets

REPRODUCING SYSTEM FOR AN OPTICAL DISC

BACKGROUND OF THE INVENTION

The present invention relates to a system for reproducing data recorded on an optical disc, and more particularly to a system for reducing noises to be included in a reproduced signal.

FIGS. 8a and 8b show a conventional signal reproducing system. The system comprises a semiconductor laser 10 as a point light source for emitting a laser beam, a half mirror 20 reflecting and transmitting the laser beam, an objective 21 focusing the reflected beam from the half mirror 20 on a recording surface of an optical disc 100. A photodetector 30 comprising photodiodes divided into four quadrants (4D-PD) is provided for detecting the reflected beam from the disc through the half mirror, and an operating circuit 6 applied with signals from the photodetector 30 operates for adding and subtracting the signals and producing a focus error signal and a data signal.

The laser beam emitted form the semiconductor laser 10 is focused on the recording surface of the disc 100 through the half mirror 20 and the objective 21. The diameter of the laser beam is about 0.1 μm at an emitting point.

Since the wavelength λ of the beam and the numerical aperture NA of the objective are determined to λ/NA>0.1 μm, a beam spot on the disc 100 is limited to λ/NA in accordance with the diffraction limit.

On the disc, information is previously recorded by changing of the optical character of the disc. For an example, a disc having different parts in reflectance will be described. If the coloring matter in a recording film of the disc is previously photosensitized, or by using the difference state of the recording film between crystalline and amorphous states, the information is written on the disc.

The intensity of the reflected light from the disc become high or low by the difference of the reflectance. The light is focused on the photodetector 30 through the objective 21 and the half mirror 20. When passing through the half mirror, the reflected light is astigmatized, causing the cross sectional shape of the reflected light to be elliptic. The photodetector 30 is disposed at the spot between the elliptic portions. The beam spot is detected by the photodetector having a detecting surface larger than the diameter of the beam spot so that the beam spot is detected as one signal.

FIG. 8c shows respective images of the beam spots on the photodetector.

However, the detected signal may include noises. The noises include first noises dependent on the laser beam and external noises which do not have relation to the scanning speed for the bits, and further include second noises dependent on the shape of the pit which has relation to the scanning speed. In the conventional system, it is impossible to separate the first noises from the second noises. In order to improve the SN ratio, it is necessary to use a semiconductor laser emitting the beam of a large power. However, such a laser causes reliability of a recording medium to reduce and the price of the reproducing device to increase.

Japanese Patent Publication No. 61-8494 discloses an optical reproducing system. In the system, a part of a beam applied to a disc is covered to an electric energy, and the variation of the intensity of the light is detected so as to control the laser, thereby stabilizing the laser power.

In such a system, it is necessary to provide a high bandwidth modulator and a beam splitter for detecting the variation of the light, which causes the structure of the system to complicate.

SUMMARY OF THE INVENTION

An object of the present invention is to provide a signal reproducing system which is simple in construction and may reduce noises included in a signal derived from an optical disc.

According to the present invention, there is provided a reproducing system for an optical disc which has recorded information and is irradiated with a laser beam emitted from a laser in order to read the information in a first range.

The system has lighting means for lighting the disc in a second range having such an area that intensity of reflected light does not change with change of the recorded information, a first photodetector for detecting intensity of light reflected on the first range, a second photodetector for detecting intensity of light reflected on the second range.

A subtracter is provided for producing the difference between an output of the first photodetector and an output of the second photodetector, and an alternating current detector is provided for producing an output at a slice level where the difference of the subtracter becomes zero.

Thus, noises included in the output of the first photodetector which do not change with change of the information are eliminated.

The other objects and features of this invention will become understood from the following description with reference to the accompanying drawings.

DETAILED DESCRIPTION OF THE PREFERRED EMBODIMENTS

Figure 1:
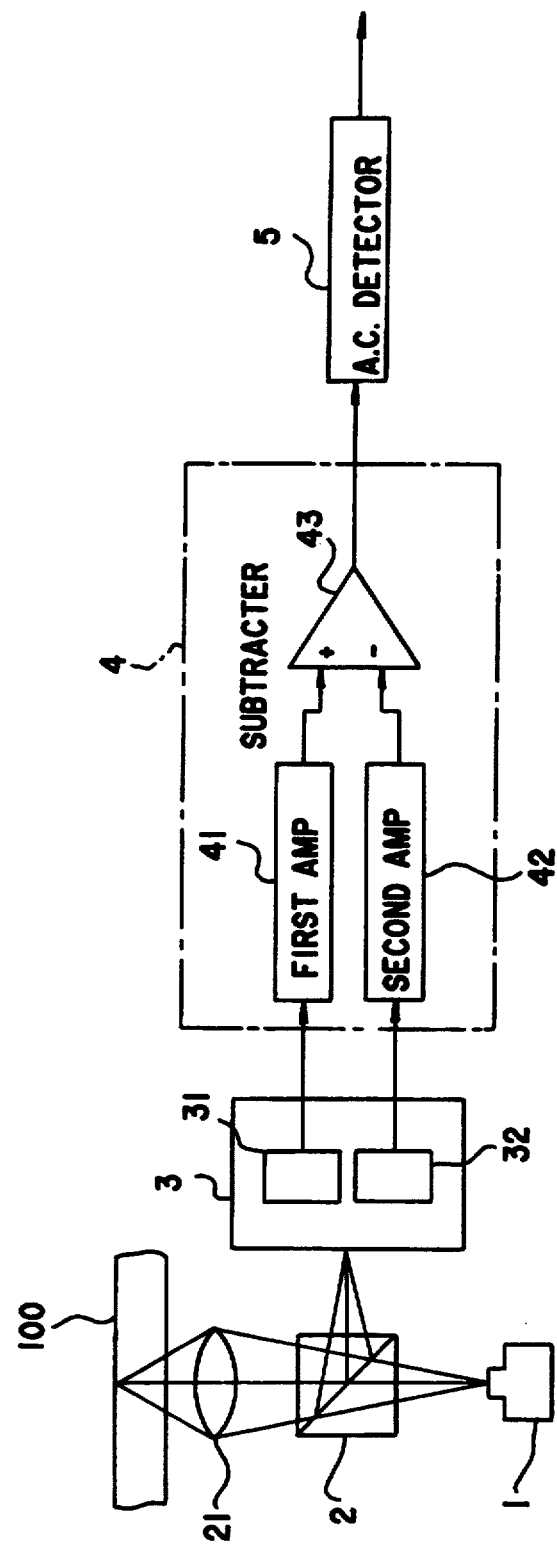
FIG. 1 is a schematic diagram showing an optical signal reproducing system for an optical disc to which the present invention is applied.
Figure 8A:
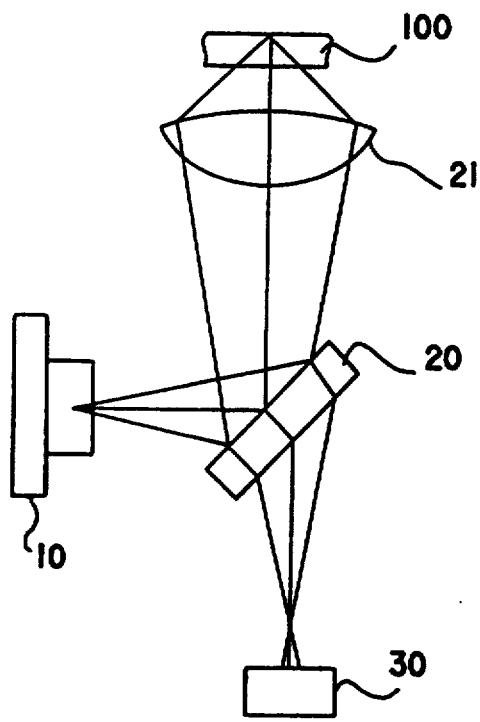
FIGS. 8a and 8b are schematic diagrams showing a conventional optical signal reproducing system.
Figure 8B:
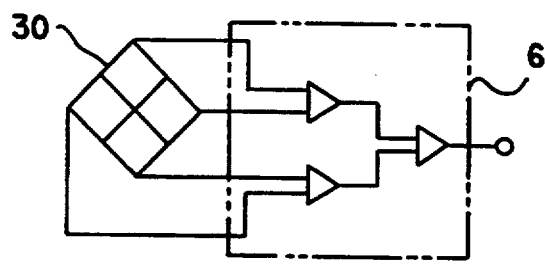
Figure 8C:
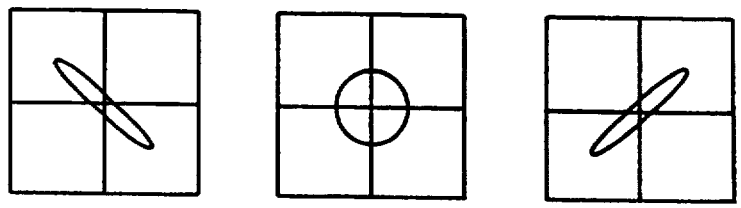
FIG. 8c shows images of reflected beam on conventional photodiodes.

Referring to FIG. 1, an optical system according to the present invention comprises a semiconductor laser 1 (corresponding to the laser 10 of FIG. 8a), a beam splitter 2 (corresponding to the half mirror 20) and the objective 21. The beam is focused on the optical disc 100 by the objective 21, and reflected thereon.

Figure 2:
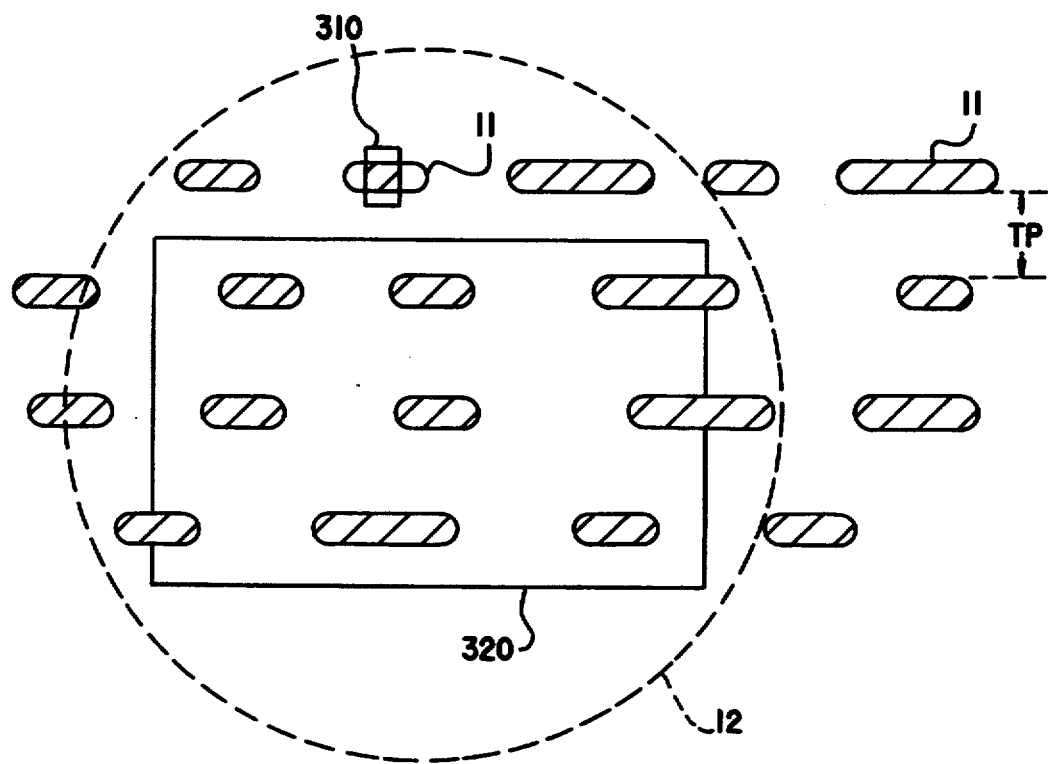
FIG. 2 is a schematic diagram showing detecting areas of photodetectors on a recording surface of a disc.

The reflected light from the optical disc 100 is reflected on the beam splitter 2 where the beam is changed in a perpendicular direction and applied to a photodetector 3 comprising a pair of detector elements 31 and 32. The detector elements 31 and 32 detect data recorded on the disc in the different manners as shown in FIG. 2. FIG. 2 shows detecting areas of the detector elements 31 and 32 in a spot 12 on the disc.

The first detector element 31 has a detecting area 310 wherein the tangential length of the detecting area 310 is shorter than the length of the shortest pit 11 and the width thereof is narrower than the track pitch TP. Thus, the pit 11 is detected one by one. The second detector element 32 has a detecting area 320 wherein the length of the detecting area 320 is longer than twice the length of the longest pit and the width thereof is wider than the track pitch. Thus, the detector element 32 detect an average intensity of the reflected light in the reproduction of the whole disc. Therefore, the detected signal by the second detector element 32 does not vary with the data dependent on the pits.

Figure 3A:
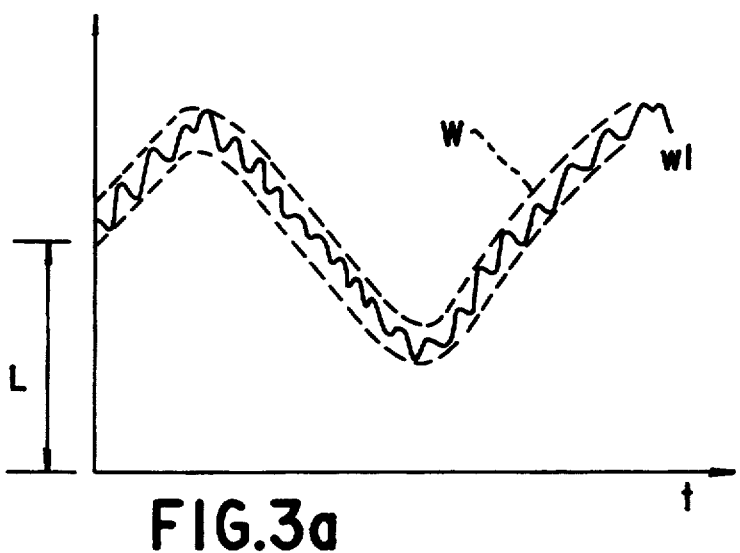
FIGS. 3a and 3b show waveforms of detected output signals.
Figure 3B:
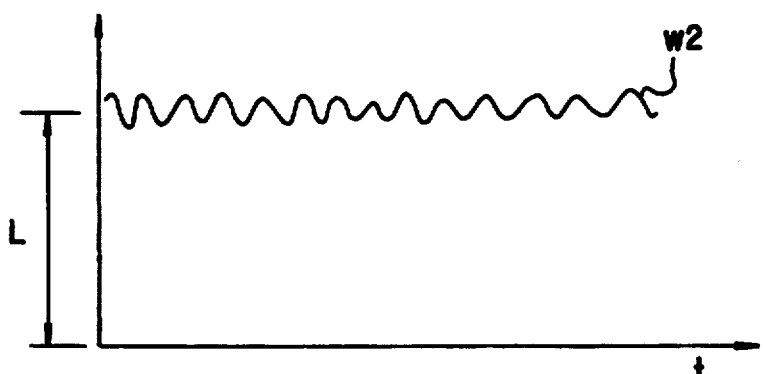

FIGS. 3a and 3b show waveforms of output signals from the detector elements 31 and 32, respectively. In FIG. 3a, a large waveform W represents a pit signal obtained by scanning the information pits 11 with the detector element 31. A small waveform w1 along the large waveform W represents noises included in the laser beam. Since the noises exist in the laser beam, the noises change with time irrespective of the scanning speed. In FIG. 3b, a small waveform w2 is the same as the waveform w1 dependent on the noises in the laser beam. The level L is the average intensity of the reflected light detected by the detector element 32.

The output signals of the detector elements are applied to a direct current signal amplifier circuit 4. The amplifier circuit 4 comprises a first amplifier 41 applied with the output signal from the detector element 31, and a second amplifier 42 applied with the output signal from the detector element 32.

The amplified signals are applied to a subtracter 43 which subtracts the signal from the amplifier 42 from the signal from the amplifier 41.

Figure 4:
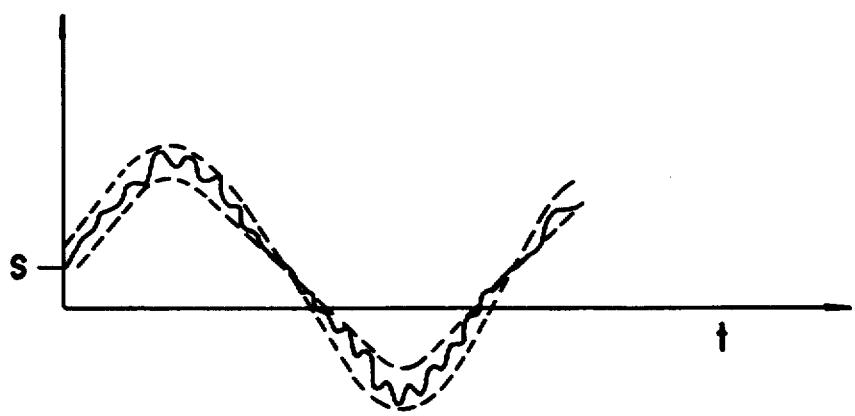
FIG. 4 shows an output waveform of a subtracter.

As aforementioned, the output signal, of the detector element 31 includes noises dependent on the laser beam and external noises which are not relative to the scanning speed. If such a signal is demodulated, noises become jitters, causing an error in the detected signal dependent on the length of the pit. The subtracter eliminates such noises as described below. FIG. 4 shows the output of the subtracter 43. As shown in the figure, the amplifying coefficients of both amplifiers 41 and 42 are determined such that the output of the subtracter becomes zero at a slice level S. Therefore, noises (w1) included in the output signal of the detector element 31 is offset by the output signal w2 of the detector element 32.

Figure 5:
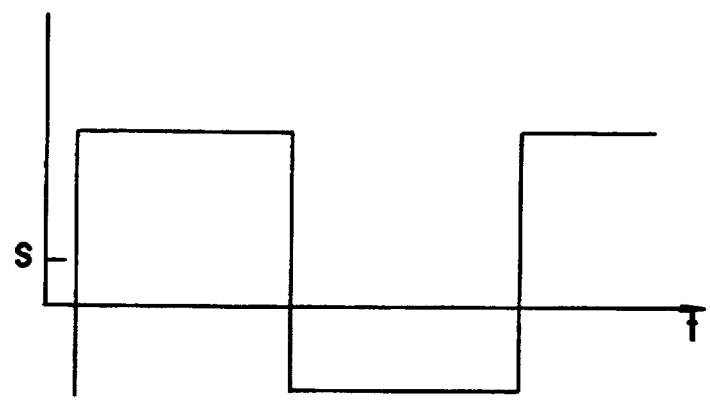
FIG. 5 shows an output waveform of a detector.

The output of the subtracter 43 is applied to an alternating current detector 5 which has the slice level S as shown in FIG. 5. Since the detector 5 produces the output signal at the slice level S, the signal does not include noises.

In accordance with the present invention, the noises are cancelled at the slice level, thereby stabilizing the operation of the system.

In the embodiment, the slice level is set to the center of the amplitude of the waveform. If slice levels are set at many levels, an operating circuit corresponding to each slice level is provided so that the same effect is obtained.

As to the method for forming the information pit on the disc, the change of reflectance is described. If phase of the reflected light is changed by forming a rough surface on the disc, the same change of the intensity of light is obtained. Furthermore, by using Kerr effect, a polarizing state of the medium is partly changed. In order to detect the change in polarization, a polarizer is provided in the optical system, which is the same as a polarizing microscope, so that the change of the intensity of light is obtained.

In the photodetector, the detecting area 310 of the detector element 31 of FIG. 2 can be disposed in the detecting area 320 of the detector element 32, or in the right or the left side of the area 310. Although the detecting area 320 is disposed on the focus position of the pit, if a focus lens is provided in front of the photodetector, it is possible to use a defocused spot.

Figure 6:
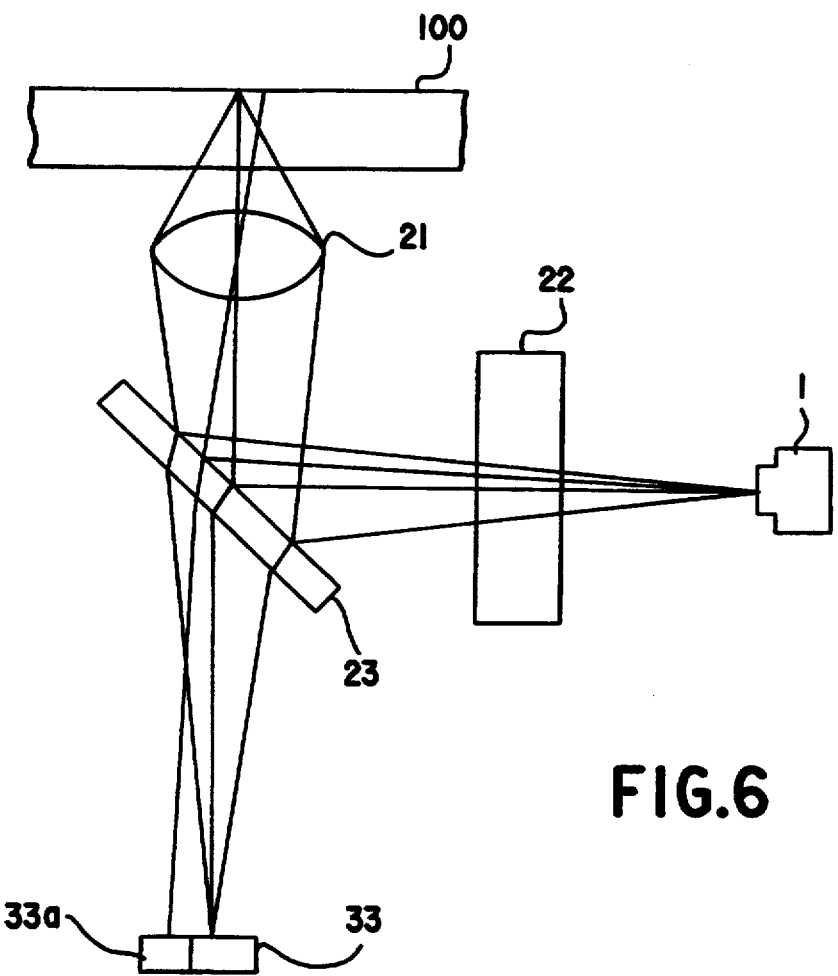
FIG. 6 is a schematic diagram of another embodiment.
Figure 7:
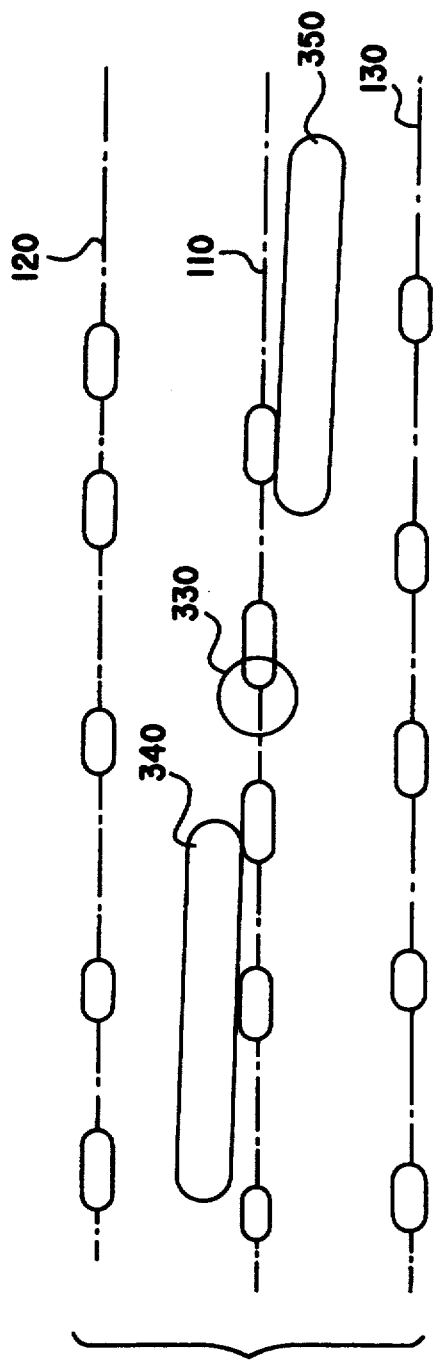
FIG. 7 is a schematic diagram of a further embodiment.

FIG. 6 shows another embodiment of the system. In the embodiment, a grating 22 is provided between the laser 1 and a beam splitter 23. The grating 22 is a concentric diffraction grating having an axis decentered from the optical axis. The grating 22 operates to transmit a zero-order light, that is a non-diffracted light, and to deflect the optical axis of a diffraction light. Accordingly, a deflected beam spot of the diffraction light is applied to the disc 100 to form a wide spot together with an ordinary small spot 330 as shown in FIG. 7.

The reflected light from the spot 330 on the disc is astigmatized by the beam splitter 23 and focused on a photodetector 33. The reflected diffraction light is focused on a photodetector 33a disposed away from the photodetector 33. Thus, the same output signals as the detecting areas 310 and 320 of FIG. 2 are obtained.

If the defocused quantity of the diffraction light by the grating 22 is determined to the half of quantity of an astigmatization by the beam splitter 23, the loss of the intensity of diffraction light is reduced, since the diffraction light is focused on the photodetector 33a.

In place of the grating, if the half mirror is used to divide the laser beam, the same effect is obtained.

Furthermore, in place of the grating (I.e. the decentered lens), it is possible to dispose a photodetector in the center of a photodetector having a wide detecting area.

As shown in FIG. 7, if three beams are used, the three-beam tracking method can be used. A laser beam emitted from a laser is split into three beams which are reflected three beam spots 330, 340 and 350 on the disc. The beam spot 330 has a length to read the recorded information the time axis direction. Each of the beam spots 340 and 350 reflected before and after the beam spot 330 has a length to average the pit information in the time axis direction and widths to detect tracking error in the radial direction.

The tracking error is detected by the difference between the intensity of the reflected light from the beam spots 340 and 350. In the method, since the modulation of the tracking error is obtained only from the position of FIG. 7, it is easy to adjust the rotation of the grating.

The detecting areas of the beam spots 340 and 350 are determined so that the sum of the intensities of the reflected light is not to be influenced by the signal in the time axis direction.

From the foregoing, it will be understood that the present invention provides a signal reproducing system which may remove noises, which vary with time, with a simple construction.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A reproducing system for an optical disc which has information recorded in various sizes of pits and is irradiated with a laser beam emitted from a laser in order to read the information in a first range, the system comprising:

lighting means for lighting the disc in a second range having such an area that intensity of reflected light does not change with change of the recorded information;

a first photodetector for detecting intensity of light reflected on the first range;

a second photodetector for detecting intensity of light reflected on the second range;

a subtractor for producing the difference between an output of the first photodetector an output of the second photodetector;

an alternating current detector for producing an output at a slice level where the difference of the subtractor becomes zero.

2. The reproducing system according to claim 1 wherein:

the first range and the second range are in a spot on the disc irradiated with the laser beam.

3. The reproducing system according to claim 1 wherein:

the first range and the second range are formed by respective spots on the disc.

* * * * *